United States Patent [19]

Viehe et al.

[11] 3,855,293
[45] Dec. 17, 1974

[54] NOVEL AMINE COMPOUNDS

[75] Inventors: Heinz Gunter Viehe; Zdenek Janousek, both of Belgium

[75] Assignee: Roussel UCLAF, Paris, France

[22] Filed: Aug. 3, 1973

[21] Appl. No.: 385,452

[30] Foreign Application Priority Data
Aug. 9, 1972 France.............................. 72.28726

[52] U.S. Cl. ......................... 260/564 R, 260/308 R
[51] Int. Cl. ......................................... C07c 123/00
[58] Field of Search .................... 260/564 R, 551 C

[56] References Cited
OTHER PUBLICATIONS
Viehe et al., "Angewandte Chemie International Edit.," Vol. 10, pp. 573–576, (1971).

Primary Examiner—Leon Zitver
Assistant Examiner—Gerald A. Schwartz
Attorney, Agent, or Firm—Hammond & Littell

[57] ABSTRACT

Novel amine compounds of the formula

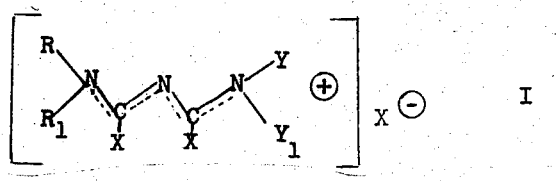

wherein $R$, $R_1$, $Y$ and $Y_1$ are individually alkyl of 1 to 5 carbon atoms and $X$ is a halogen and the dotted lines represent 2 conjugated double bonds which are useful intermediates in organic synthesis and particularly for the preparation of 1,2,4-triazoles.

7 Claims, No Drawings

NOVEL AMINE COMPOUNDS

OBJECTS OF THE INVENTION

It is an object of the invention to provide the novel amine compounds of formula I.

It is another object of the invention to provide a novel process for the preparation of the compounds of formula I.

It is a further object of the invention to provide a novel process for the preparation of 1,2,4-triazoles.

These and other objects and advantages of the invention will become obvious from the following detailed description.

The novel compounds of the invention have the formula

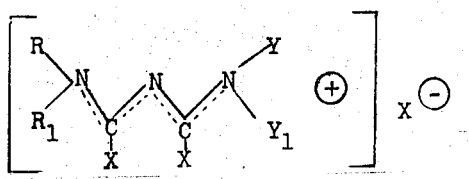   I wherein R, $R_1$, Y and $Y_1$ are individually alkyl of 1 to 5 carbon atoms and X is a halogen and the dotted lines represent 2 conjugated double bonds. X may be a halogen such as fluorine, chlorine, bromine or iodine but chlorine is preferred.

R, $R_1$, Y $Y_1$ may be alkyl such as methyl, ethyl, propyl, isopropyl, butyl, pentyl, isobutyl, tert.-butyl, etc. but all are preferably methyl.

The compounds of formula I may exist in the following two forms.

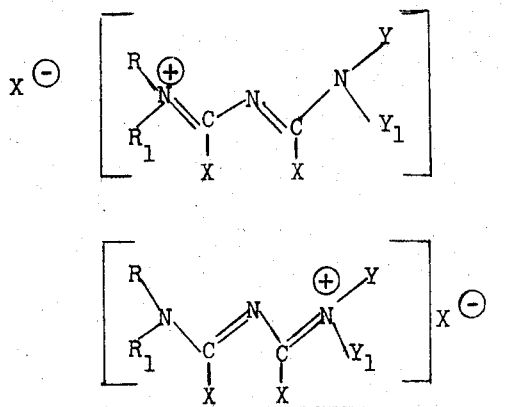   or

The novel process of the invention for the preparation of compounds of formula I comprises reacting a phosgene immonium salt of the formula

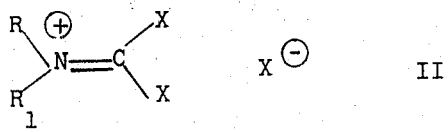   II wherein R, $R_1$ and X have the above definitions with a dialkylcyanamide of the formula

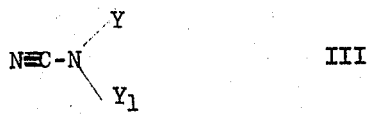   III wherein Y and $Y_1$ have the above definitions to obtain the corresponding compound of formula I.

The said reaction is preferably effected in an organic solvent inert to the reactants such as methylene chloride or chloroform using essentially equimolar amounts of the reactants. The reaction temperature may be varied from about −50°C to 150°C, preferably 0° to 50°C and most preferably at room temperature. The product of formula I may be recovered by known methods such as evaporation of the solvent or precipitation by addition of ethyl ether to make the product insoluble.

The phosgene immonium salts of formula II can be prepared by the process described by Senning [Chem. Rev., Vol. 65 (1965), p. 388] and by Viehe et al [Angewandte Chemie., Vol. 10 (1971), p. 573–574]. The dialkylcyanamides of formula III may be prepared by the process described by Kulm [Ber., Vol. 93 (1960), p. 618].

The novel process of the invention for the preparation of 1,2,4-triazoles of the formula

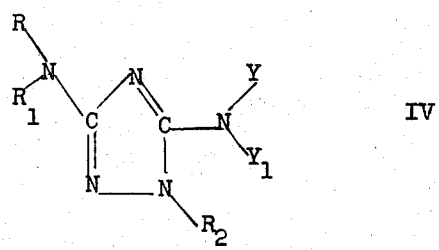   IV wherein R, $R_1$, Y and $Y_1$ have the above definition and $R_2$ is selected from the group consisting of hydrogen and phenyl comprises reacting a compound of formula I with a hydrazine of the formula $R_2$—NH—$NH_2$ where $R_2$ has the above definition to obtain the corresponding 1,2,4-triazole of formula IV.

Preferably, the reaction is effected by progressively adding equimolar amounts of the hydrazine to a solution of the compound of formula I in an organic solvent such as methylene chloride. A 5 to 30% excess of the hydrazine may be used if desired and the reaction is preferably effected in the presence of a tertiary amine such as triethylamine. The triazole may be recovered by treating the reaction mixture with an aqueous solution of an alkaline base such as an alkali metal hydroxide such as sodium hydroxide and then recovering the product of formula IV by known methods such as distillation.

The 1,2,4-triazoles of formula IV are biologically active compounds and are useful intermediates for the synthesis of biologically active compounds. They are useful in agriculture against undesired vegetation. For example, Democratic Republic of Germany Patent No. 59,288 describes some of these compounds as being useful herbicidal agents.

In the following examples there are described several preferred embodiments to illustrate the invention. However, it should be understood that the invention is not intended to be limited to the specific embodiments.

EXAMPLE 1

1.29 g of dimethylcyanamide were added with stirring to a suspension of 3 g of dichloromethylene dimethyl ammonium chloride (R and $R_1$=$CH_3$ and X = Cl) in 15 ml of methylene chloride and after stirring for 30 minutes, the greater portion of the solvent was distilled from the reaction mixture. Then, about 20 ml of ethyl ether were added to the reaction mixture which was filtered to obtain 3.92 g of a compound of formula I wherein R, $R_1$, Y and $Y_1$ were methyl and X was chlorine melting at 157°–161°C (with decomposition).
U.V. Spectrum (methylene chloride):
λ Max. at 282 nm
ε = 32,000

EXAMPLE 2

3,5-bis-(dimethylamino-1-phenyl-1,2,4-triazole 1.08 g of phenyl hydrazine and 3.4 g of triethylamine were added over about 2 hours with stirring to a solution of 1.97 g of the amine compound of Example 1 in 40 ml of methylene chloride and the mixture was then refluxed for 1 hour. The resulting solution was cooled to −10°C and 10 ml of concentrated aqueous potassium hydroxide solution were added thereto. The organic phase was separated, dried over potassium carbonate and distilled to dryness to obtain 1.83 g of 3,5-bis-(dimethylamino)-1-phenyl-1,2,4-triazole boiling at 122°C under 0.3 mm Hg. Crystallization from water gave the product melting at 75°–77°C.

Various modifications of the products and processes of the invention may be made without departing from the spirit or scope thereof and it is to be understood that the invention is to be limited only as defined in the appended claims.

We claim:
1. A compound of the formula

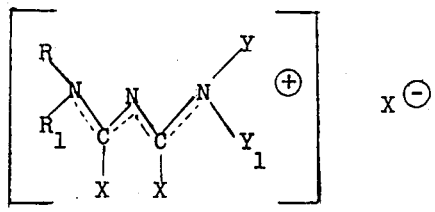

wherein R, $R_1$, Y and $Y_1$ are individually alkyl of 1 to 5 carbon atoms and X is a halogen and the dotted lines represent 2 conjugated double bonds.

2. A compound of claim 1 wherein R, $R_1$, Y and $Y_1$ are methyl and X is chlorine.

3. A compound of claim 1 wherein X is chlorine.

4. A compound of claim 1 wherein R and $R_1$ are methyl.

5. A compound of claim 4 wherein Y and $Y_1$ are methyl.

6. A process for the preparation of a compound of claim 1 comprising reacting a phosgene immonium salt of the formula

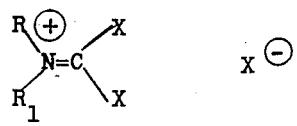

wherein R, $R_1$ and X have the definition of claim 1 with a dialkylcyanamide of the formula

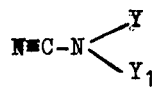

wherein Y and $Y_1$ have the definition of claim 1 to form the corresponding compound of claim 1.

7. The process of claim 6 wherein the reaction is effected at 0° to 50°C with substantially equimolar amounts of the reactants in an organic solvent.

* * * * *